United States Patent [19]
Mafoti et al.

[11] Patent Number: 5,614,605
[45] Date of Patent: Mar. 25, 1997

[54] RIGID POLYURETHANES BASED ON ALLOPHANATE-MODIFIED ALIPHATIC AND/OR CYCLOALIPHATIC POLYISOCYANURATES

[75] Inventors: Robson Mafoti, Pittsburgh, Pa.; William E. Slack, Moundsville, W. Va.

[73] Assignee: Bayer Corporation, Pittsburgh, Pa.

[21] Appl. No.: 359,213

[22] Filed: Dec. 19, 1994

[51] Int. Cl.$^6$ ............... C08G 18/00
[52] U.S. Cl. ............... 528/44; 528/49; 528/59; 528/60; 528/65; 528/76; 528/77; 528/85; 521/159; 521/170; 521/174
[58] Field of Search ............... 528/44, 49, 59, 528/60, 65, 76, 77, 85; 521/159, 170, 174

[56] References Cited

U.S. PATENT DOCUMENTS

| | | | |
|---|---|---|---|
| 5,124,427 | 6/1992 | Potter et al. | 528/67 |
| 5,208,334 | 5/1993 | Potter et al. | 544/193 |
| 5,235,018 | 8/1993 | Potter et al. | 528/49 |
| 5,277,862 | 1/1994 | Steppan et al. | 264/257 |
| 5,290,902 | 3/1994 | Jacobs et al. | 528/49 |
| 5,380,792 | 1/1995 | Renk | 524/840 |

*Primary Examiner*—Samuel A. Acquah
*Assistant Examiner*—Duc Truong
*Attorney, Agent, or Firm*—Joseph C. Gil; Richard E.L. Henderson

[57] ABSTRACT

This invention relates to rigid polyurethanes prepared by reaction, at an isocyanate index of 95 to 110, of (a) an allophanate-modified aliphatic and/or cycloaliphatic polyisocyanurate;

(b) 20 to 100% by weight, relative to the total of components (b) and (c), of (i) one or more polyether and/or polyester polyols containing three or more isocyanate-reactive hydroxyl groups and having a molecular weight of 200 to 6000, and (ii) 0 to 30% by weight, relative to component (b)(i), of one or more isocyanate-reactive compounds other than a polyether or polyester of component (b)(i) and containing two or more isocyanate-reactive hydroxyl groups and having a molecular weight of about 400 to about 10,000, (c) 0 to 30% by weight, relative to the total of components (b) and (c), of a chain extender and/or crosslinker other than a polyether or polyester and having a molecular weight of from 32 to 399, wherein the amounts of components (b) and (c) total 100% by weight.

4 Claims, No Drawings

RIGID POLYURETHANES BASED ON ALLOPHANATE-MODIFIED ALIPHATIC AND/OR CYCLOALIPHATIC POLYISOCYANURATES

BACKGROUND OF THE INVENTION

This invention relates to rigid polyurethanes characterized by high flexural modulus, high Shore D hardness, and good abrasion resistance that are prepared from allophanate-modified aliphatic and/or cycloaliphatic polyisocyanurates.

The use of polyurethanes in the manufacture of bowling balls is known. One object of the present invention was to obtain polyurethanes having improved flexural modulus, hardness, and abrasion resistance for use in such applications. Another object was to prepare polyurethanes using lower volatility polyisocyanates than is typical for such applications and thereby to reduce the likelihood of releasing isocyanate-containing compounds into the atmosphere where they could pose environmental or health risks. It has now been found that the use of allophanate-modified aliphatic and/or cycloaliphatic polyisocyanurates in combination with high functionality polyols can provide such advantages.

SUMMARY OF THE INVENTION

This invention relates to rigid polyurethanes prepared by reaction, at an isocyanate index of about 95 to about 110 (preferably about 105), of (a) an allophanate-modified aliphatic and/or cycloaliphatic polyisocyanurate;

(b) about 20 to 100% by weight (preferably 30 to 100% by weight), relative to the total of components (b) and (c), of (i) one or more polyether and/or polyester polyols (preferably a polyether polyol) containing three or more isocyanate-reactive hydroxyl groups and having a molecular weight of about 200 to about 6000 (preferably 240 to 5000), and (ii) 0 to about 30% by weight (preferably 0 to 20% by weight), relative to component (b)(i), of one or more isocyanate-reactive compounds other than a polyether or polyester of component (b)(i) and containing two or more isocyanate-reactive hydroxyl groups and having a molecular weight of about 400 to about 10,000 (preferably 400 to 5000), (c) 0 to about 30% by weight (preferably 5 to 20% by weight), relative to the total of components (b) and (c), of a chain extender and/or crosslinker other than a polyether or polyester of component (b) and having a molecular weight of from 32 to 399, wherein the amounts of components (b) and (c) total 100% by weight.

DETAILED DESCRIPTION OF THE INVENTION

Suitable allophanate-modified polyisocyanurates (a) can be prepared by trimerizing an organic polyisocyanate in the presence of a monofunctional alcohol and a catalyst by methods known in the art. E.g., U.S. Pat. Nos. 5,124,427, 5,208,334, and 5,235,018 and U.S. application Ser. No. 08/003,779 (filed Jan. 13, 1993). Such allophanate-modified aliphatic polyisocyanurates are typically less volatile than the unmodified starting organic polyisocyanate and are thus less likely to evaporate into the atmosphere where they could pose environmental or health risks. Suitable organic polyisocyanates for the preparation of such allophanate-modified polyisocyanurates include aliphatic and/or cycloaliphatic polyisocyanates of the type described, for example, by W. Siefken in *Justus Liebigs Annalen der Chemie*, 562, pages 75 to 136. Such isocyanates include those having the formula $$Q(NCO)_n$$

in which n is a number from 2 to about 5 (preferably 2 to 3) and Q is an aliphatic hydrocarbon group containing 2 to about 18 (preferably 6 to 10) carbon atoms or a cycloaliphatic hydrocarbon group containing 4 to about 15 (preferably 5 to 10) carbon atoms. Examples of suitable isocyanates include ethylene diisocyanate; 1,4-tetramethylene diisocyanate; 1,6-hexamethylene diisocyanate; 1,12-dodecamethylene diisocyanate; cyclobutane-1,3-diisocyanate; cyclohexane-1,3- and -1,4-diisocyanate, and mixtures of these isomers; 1-isocyanato-2-isocyanatomethylcyclopentane; 1-isocyanato-1-methyl-3- and/or -4-isocyanatomethylcyclohexane; 1,3-and 1,4-bis(isocyanatomethyl)cyclohexane; 1-isocyanato-3,3,5-trimethyl-5-isocyanatomethylcyclohexane ("isophorone diisocyanate"; see, e.g. German Auslegeschrift 1,202,785 and U.S. Pat. No. 3,401,190); 2,4- and 2,6-hexahydrotoluene diisocyanate and mixtures of these isomers; dicyclohexylmethane-4,4'-diisocyanate ("hydrogenated MDI", or "HMDI"), including the t,t-, c,t-, and c,c-isomers thereof; dicyclohexylmethane-2,4'-diisocyanate; and norbornane diisocyanates, such as described in U.S. Pat. No. 3,492,330. It is possible, although less preferred, to use the isocyanate-containing distillation residues accumulating in the production of isocyanates on a commercial scale, optionally in solution in one or more of the polyisocyanates mentioned above. It is also possible, although much less preferred, to use additionally modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is, of course, also possible to use mixtures of the polyisocyanates described above. Polyfunctional allophanate-modified aliphatic isocyanurates, especially those based on hexamethylene diisocyanate, are particularly preferred.

Suitable polyether and/or polyester polyols (b)(i) contain three or more (preferably 3 to 8, more preferably 3 or 4) isocyanate-reactive hydroxyl groups and have a molecular weight of about 200 to about 6000 (preferably 240 to 5000).

Suitable polyether polyols for use as component (b)(i) are known and may be prepared, for example, by the polymerization of epoxides, optionally in the presence of a catalyst such as $BF_3$, or by chemical addition of such epoxides, optionally as mixtures or successively, to starting components containing reactive hydrogen atoms. Suitable epoxides include ethylene oxide, propylene oxide, butylene oxide, tetrahydrofuran, styrene oxide, or epichlorohydrin. Suitable starter components include alcohols and/or amines, including, for example, trimethylolpropane, 4,4'-dihydroxydiphenylpropane, ammonia, ethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups. Particularly preferred polyethers include polyoxyalkylene polyether polyols based on trifunctional or higher functionality starter components.

Suitable polyester polyols for use as component (b)(i) include reaction products of polyhydric alcohols (preferably diols), and polybasic (preferably tribasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include trimellitic acid and other trifunctional or higher functionality carboxylic acids. Suitable polyhydric alcohols include ethylene glycol, 1,2- and 1,3-propanediol, 1,4-and 2,3-butanediol, 1,6-hexanediol, 1,8-octanediol, neopentyl glycol, 1,3- and 1,4-bis(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Hydrolytically stable polyesters are preferably used in order to obtain the greatest benefit relative to the hydrolytic stability of the final product. Preferred polyesters, when used at all, include polyesters obtained from trimellitic anhydride and straight chained or branched diols.

Although polyesters can be used as the only polyol in component (b)(i), it is preferable to use polyether polyols or, less preferably, mixtures of polyether and polyester polyols containing up to about 30% by weight (preferably no more than 20% by weight) of the polyester polyol based on the total amount of component (b)(i).

Component (b) can also contain up to 30% by weight, relative to the amount of component (b)(i), of other relatively high molecular weight isocyanate-reactive compounds (b)(ii). In particular, it is possible to include up to 30% by weight of polyether or polyester diols without adversely affecting the properties of the resultant polyurethane product. It is also possible to include other types of isocyanate-reactive hydroxy- or amino-containing polyacetals, polycarbonates, polyesterethers, polythioethers, polyamides, polyesteramides, polysiloxanes, polybutadienes, and polyacetones known in the art, as well as amino-containing polyethers and polyesters. For example, suitable isocyanate-reactive compounds containing amino groups include the so-called amine-terminated polyethers containing primary or secondary (preferably primary) aromatically or aliphatically (preferably aliphatically) bound amino groups. (As used herein, the term "polyurethane" is intended to encompass polyurethane polyureas and polyureas.)

In preparing polyurethanes according to this invention, it is also possible to include known chain-extenders and/or crosslinkers (c) other than polyethers or polyesters such as those used as component (b)(i). That is, suitable chain-extenders (c) include compounds having two or more isocyanate-reactive groups and molecular weights of from 32 to 399 (except for isocyanate-reactive polyethers or polyesters within the definition of component (b)). Suitable chain-extenders and/or crosslinkers can contain hydroxyl groups, amino groups, and/or thiol groups. Although amine-containing chain extenders can be used, chain extenders and crosslinkers containing hydroxyl groups are preferred. Preferred hydroxyl-containing chain extenders and crosslinkers include glycols and polyols, such 1,2-ethanediol, 1,2- and 1,3-propylene glycol, 1,4- and 2,3-butylene glycol, 1,6-hexanediol, 1,8-octanediol, neopentyl glycol, cyclohexanedimethanol, 1-methyl-1,3-propanediol, 2-methyl-1,3-propanediol, glycerol, trimethylolpropane, 1,2,6-hexanetriol, 1,2,4-butanetriol, and trimethylolethane, as well as amino alcohols such as ethanolamine, diethanolamine, N-methylethanolamine, N-ethylethanolamine, N-methyldiethanolamine, and N-ethyldiethanolamine.

If amine chain extenders are used, the preferred amines contain exclusively aromatically bound primary or secondary (preferably primary) amino groups and preferably also contain alkyl substituents. Examples of such diamines include 1,4-diaminobenzene, 2,4-diaminotoluene, 2,4'- and/ or 4,4'-diaminodiphenylmethane, 3,3'-dimethyl-4,4'-diaminodiphenylmethane, 1-methyl-3,5-bis(methylthio)-2,4- and/ or -2,6-diaminobenzene, 1,3,5-triethyl-2,4-diaminobenzene, 1,3,5-triisopropyl-2,4-diaminobenzene, 1-methyl-3,5-diethyl-2,4- and/or-2,6-diaminobenzene, 4,6-dimethyl-2-ethyl-1,3-diaminobenzene, 3,5,3',5'-tetraethyl-4,4-diaminodiphenylmethane, 3,5,3',5'-tetraisopropyl-4,4'-diaminodiphenylmethane, and 3,5-diethyl-3',5'-diisopropyl-4,4'-diaminodiphenylmethane. Such diamines may, of course, also be used as mixtures.

Catalysts, although not necessary, are generally advantageous. Suitable catalysts include organic metal compounds, especially organic tin and bismuth compounds. Suitable organic tin compounds include those containing sulfur, such as dioctyl tin mercaptide (German Auslegeschrift 1,769,367 and U.S. Pat. No. 3,645,927), and, preferably, tin(II) salts of carboxylic acids, such as tin(II) acetate, tin(II) octoate, tin(II) ethylhexoate, and tin(II)laurate, as well as tin(IV) compounds, such as dibutyltin dilaurate, dibutyltin dichloride, dibutyltin diacetate, dibutyltin maleate, and dioctyltin diacetate. Suitable bismuth compounds include bismuth neodecanoate, bismuth versalate, and various bismuth carboxylates known in the art. Any of the above-mentioned catalysts may, of course, be used as mixtures. The catalysts are generally used in a quantity ranging from about 0.001 to about 10% by weight, based on the quantity of polyisocyanate.

Auxiliary agents and additives may optionally also be used in the preparation of polyurethanes of the invention. Suitable auxiliary agents and additives may include, for example, internal mold release agents, surface-active additives, pigments, dyes, plasticizers, fungistatic or bacteriostatic substances, and fillers, such as those described in European Patent Application 81,701 at column 6, line 40, to column 9, line 31. When used, the preferred auxiliary agents and additives include known fillers and/or reinforcing substances, such as barium sulfate, kieselguhr, whiting, mica, and especially glass fibers, liquid crystal fibers, glass flakes, glass balls, aramide fibers, and carbon fibers. These fillers and/or reinforcing materials may be added in quantities of up to 80% by weight (preferably up to 30% by weight) based on the total quantity of filled or reinforced polyurethane.

The polyurethanes of the present invention may be prepared by introducing starting materials or mixtures thereof into a suitable mold using the known one-stage process, prepolymer process, or semi-prepolymer process. Machines suitable for the process are described, for example, by J. K. Rogers, *Plastics Technology,* 66, 50–58 (1989). See also G. R. Smoluk, *Modern Plastics,* 35, 57–65 (January, 1989), and R. V. Wilder, *Modern Plastics,* 66, 48–50 (July, 1989).

In the one-stage (or "one-shot") method, the isocyanate-reactive components (b) and (c), as well as any catalysts, additives, and auxiliaries, are combined and thoroughly blended in a premix. The organic polyisocyanate is then mixed with the premix in an appropriate open mold or molding machine. External release agents, such as silicone oils, are often used during the molding process. It is, however, also possible to use so-called "internal release agents", optionally in admixture with external release agents, as described, for example, in German Offenlegungsschriften 2,121,670 and 2,307,589.

In the prepolymer method, a prepolymer is formed by reacting the polyisocyanate with a portion of the isocyanate-reactive component (b) or a blend of components (b) with component (c). The prepolymer is then allowed to react with the balance of the isocyanate-reactive components in the open mold or molding machine.

The semiprepolymer method is similar to the prepolymer method except that a portion of the organic polyisocyanate remains unreacted. That is, the isocyanate component is a mixture of unreacted polyisocyanate and true prepolymer. As in the prepolymer method, the semi-prepolymer is then allowed to react with the balance of the isocyanate-reactive components to form the polyurethane product.

Regardless of the method used, the reactive components are used in quantities such that the isocyanate index is from about 95 to about 110 (preferably about 105). By "isocyanate index" is meant the quotient of the number of isocyanate groups divided by the number of isocyanate-reactive groups, multiplied by 100.

The polyurethanes of the invention are preferably prepared by casting into a suitable open mold using one of the above-mentioned methods. The temperature at which the polyurethanes of the invention are prepared is generally not critical but the mold temperature is preferably about 40° C. to about 80° C.

It is also possible, although generally less preferred, to prepare the polyurethanes of the invention by the known resin transfer molding ("RTM") technique or, when using the more rapidly reacting starting materials, the known reaction injection molding ("RIM") technique.

The equipment and techniques used for the resin transfer molding differ significantly from those used for structural RIM processing (or for casting into an open mold). In resin transfer molding, for example, reactants are mixed using static or motionless mixers rather than high speed/high impingement mixers. Injection times for resin transfer molding are typically 30 seconds to 15 minutes, as opposed to about 1 to 5 seconds for the RIM process, and gel times are typically 20 to 40 minutes, as opposed to 5 to 30 seconds for the RIM process. Injection pressures for resin transfer molding are typically only 10 to 100 psi (about 0.07–0.7 MPa), as opposed to about 1000 to 3000 psi (about 7 to 21 MPa) for structural RIM processes. Consequently, it is possible to use less sophisticated injectors, simpler molds, and smaller mold clamps for resin transfer molding. However, whereas typical structural RIM molds are essentially self-sealing and only passively vented, resin transfer molds typically require a gasketed seal because of the long gel times and are fitted with manually operated vents to permit overfilling to remove air and wet any reinforcing mats.

The rigid polyurethanes of the present invention are characterized by high flexural modulus (preferably greater than 2000 MPa.s), high Shore D hardness (preferably at least about 75), and good Taber abrasion resistance (preferably less than 800 mg/1000 cycles). Consequently, polyurethanes prepared according to the invention are particularly suited for use in bowling ball coverstocks, in floor beds for trucks, and in other applications for which high modulus polyurethanes are required or desired.

The following examples further illustrate details for the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Example 1

Allophanate-modified isocyanurate of hexamethylene diisocyanate

Hexamethylene diisocyanate (100 g) was added to a reactor equipped with a gas bubbler, stirrer, thermometer, and dropping funnel and heated to 90° C. while dry nitrogen gas was bubbled through with stirring. To the stirred hexamethylene diisocyanate was added 4.4 g of butanol containing 0.0031 g of trimethylbenzylammonium hydroxide at a rate sufficient to maintain the temperature at 90° C. The reaction mixture was then maintained at 90° C. for an additional 15 minutes, after which was added 0.0031 g of di(2-ethylhexyl) phosphate. The resultant mixture had an NCO content of 33.1%. Residual monomeric diisocyanate was removed by wiped thin-film evaporation to provide an allophanate-modified isocyanurate of hexamethylene diisocyanate as an almost colorless (APHA 25) liquid having a viscosity of 1260 mPa.s (25° C.), an NCO content of 19.7%, and a free monomeric diisocyanate content of 0.22%.

Examples 2–8

Polyurethanes prepared using the allophanate-modified isocyanurate of hexamethylene diisocyanate The following isocyanate-reactive starting materials were used for preparing the polyurethanes of Examples 2–8:

Polyether triol 1: Ethanolamine-started polyether of propylene oxide having a functionality of 3 and a hydroxyl number of 700

Polyether triol 2: Glycerol-started polyether of propylene oxide and ethylene oxide (87 wt.% propylene oxide and 13 wt.% ethylene oxide) having a functionality of 3 and a hydroxyl number of 35

Polyether tetraol: Ethylenediamine-started polyether of propylene oxide having a functionality of 4 and a hydroxyl number of 630

Polyether diol: Propylene-glycol-started polyether of propylene oxide and ethylene oxide (80 wt.% propylene oxide and 20 wt.% ethylene oxide) having a functionality of 2 and a hydroxyl number of 28

Polyester triol: Adduct of trimellitic acid and 2-methyl-1,3-propanediol (equivalent ratio of 1:3)

Polyester diol: Ethylene/butylene (1:1) adipate ester having a hydroxyl number of 56

The following catalyst was used in the preparation of the polyurethanes of Examples 2–8:

Catalyst 1: Dibutyltin dilaurate (commercially available as Dabco T12 from Air Products & Chemicals, Inc.)

A half-liter container was charged with 100 g of a blend of the isocyanate-reactive components and catalyst. A second half-liter container was charged with a slight excess of the allophanate-modified isocyanurate of Example 1. The containers were degassed by evacuating in a vacuum oven at 90° C. for about 40 minutes. After catalyst was added to the isocyanate-reactive blend, the isocyanurate component was added and the resultant mixture was blended with a variable-speed mixer for 45 seconds. A book mold containing inserts to form samples having an appropriate shape for physical testing was sprayed with a silicone mold release agent and preheated to 65° C. The reactive mixture was poured slowly into the mold and placed into an oven at 65° C. for 10 minutes. The parts were removed form the mold and allowed to age for four hours before testing for physical properties. Compositions and physical properties for the polyurethanes of Examples 2–8 are shown in Table 1.

Examples 2–6 illustrate the preparation of polyether based polyurethanes according to the present invention. Comparison Example 7 illustrates the preparation of a dramatically inferior polyurethane prepared using a polyether diol in an amount exceeding the quantity range specified for rigid polyurethanes according to the invention.

Example 8 illustrates the preparation of a polyester-based polyurethane according to the present invention. Although the physical characteristics of the polyester-based polyurethane of Example 8 are excellent, the properties of this polyurethane, particularly die C tear and taber abrasion resistance, were generally not as good as those of the polyether-based polyurethanes of Examples 2–6.

TABLE 1

Composition and properties of polyurethanes of Examples 2–8

| | Examples | | | | | | |
|---|---|---|---|---|---|---|---|
| | 2 | 3 | 4 | 5 | 6 | 7(c) | 8 |
| Isocyanate-reactive component (wt. %) | | | | | | | |
| Polyether triol 1 | 80 | 80 | 65 | 65 | 70 | 45 | — |
| Polyether triol 2 | — | — | 15 | — | — | — | — |
| Polyether tetraol | 20 | 20 | 20 | 20 | — | — | — |
| Polyether diol | — | — | — | 15 | 30 | 55 | — |
| Polyester triol | — | — | — | — | — | — | 90 |
| Polyester diol | — | — | — | — | — | — | 10 |
| Catalyst 1 | 1.7 | 0.5 | 0.5 | 0.5 | 1.7 | 0.4 | 0.5 |
| Isocyanurate component (wt. %) | | | | | | | |
| Isocyanurate | 285.3 | 288 | 246.4 | 246 | 207.3 | 125.1 | 143.8 |
| NCO index | 105 | 105 | 105 | 105 | 105 | 105 | 105 |

TABLE 1-continued

Composition and properties of polyurethanes of Examples 2–8

| | Examples | | | | | | |
|---|---|---|---|---|---|---|---|
| | 2 | 3 | 4 | 5 | 6 | 7(c) | 8 |
| Physical data | | | | | | | |
| Flex modulus (MPa) | 1868 | 2156 | 1450 | 1033 | 666 | 15 | 1774 |
| Tensile str. (MPa) | 58.2 | 60.5 | 51.4 | 27.2 | 25.0 | 8.1 | 54.7 |
| Elongation (%) | 4.5 | 2.3 | 4.7 | 9.5 | 7.1 | 67.4 | 2.9 |
| Shore D hardness | | | | | | | |
| 1 sec | — | 77 | 74 | 70 | — | 35 | 73 |
| 5 sec | — | 74 | 70 | 66 | — | 25 | 70 |
| Die C tear (N/mm) | 111.6 | 108.3 | 110.4 | 114.8 | 126.1 | 19.9 | 81.2 |
| Taber abrasion res. (mg/1000 cycle) | 637 | 788 | 654 | 659 | 717 | 461 | 881 |

Examples 9–10

Comparison polyurethanes prepared using unmodified polyisocyanates

Examples 9 and 10 were carried out by the method of Examples 2–8 using the following organic polyisocyanates not according to the invention:

Polyisocyanate 1: Hexamethylene diisocyanate

Polyisocyanate 2: A polymeric diphenylmethane diisocyanate having an isocyanate content of about 32.3% (available as MONDUR MR-Lite from Miles Inc.)

The following catalysts were used in the preparation of the polyurethanes of Examples 9 and 10:

Catalyst 1: Dibutyltin dilaurate (commercially available as Dabco T12 from Air Products & Chemicals, Inc.)

Catalyst 2: 1,4-Dimethylpiperazine

Catalyst 3: Organotin sulfur catalyst available commercially as Topcat 190 from Tylo Industries Compositions and physical properties for the polyurethanes of Examples 9 and 10 are shown in Table 2.

Example 9 illustrates the preparation of a polyurethane based on unmodified hexamethylene diisocyanate and is a comparison for Example 2 of the invention. The polyurethane of Example 2 according to the invention exhibited comparable physical properties while avoiding the use of the more volatile unmodified hexamethylene diisocyanate.

Example 10 illustrates the preparation of a polyurethane based on an unmodified aromatic diisocyanate and corresponds approximately to comparison Example 7 (prepared using a modified polyisocyanurate but with more than the specified amount of polyether diol).

TABLE 2

Composition and properties of polyurethanes of Comparison Examples 9 and 10

| | Examples | |
|---|---|---|
| | 9(c) | 10(c) |
| Isocyanate-reactive component (wt. %) | | |
| Polyether triol 1 | 80 | 45 |
| Polyether tetraol | 20 | — |
| Polyether diol | — | 55 |

TABLE 2-continued

Composition and properties of polyurethanes of
Comparison Examples 9 and 10

| | Examples | |
|---|---|---|
| | 9(c) | 10(c) |
| Catalyst 1 | 1.7 | — |
| Catalyst 2 | — | 0.17 |
| Catalyst 3 | — | 0.05 |
| Isocyanate component (wt. %) | | |
| Polyisocyanate 1 | 110 | — |
| Polyisocyanate 2 | — | 81 |
| NCO index | 105 | 105 |
| Physical data | | |
| Flex modulus (MPa) | 2404 | 1607 |
| Tensile str. (MPa) | 70.8 | 39.3 |
| Elongation (%) | 3.7 | 12.1 |
| Shore D hardness | | |
| 1 sec | — | 71 |
| 5 sec | — | 69 |
| Die C tear (N/mm) | 90.8 | 49.4 |
| Taber abrasion res. (mg/1000 cycle) | 630 | 674 |

What is claimed is:

1. A rigid polyurethane prepared by reaction, at an isocyanate index of 95 to 110, of a mixture consisting essentially of
   (a) an allophanate-modified aliphatic and/or cycloaliphatic polyisocyanurate; and
   (b)
      (i) one or more polyether polyols containing three or more isocyanate-reactive hydroxyl groups and having a molecular weight of 200 to 6000, and
      (ii) 0 to 30% by weight, relative to component (b)(i), of one or more isocyanate-reactive compounds other than a polyether of component (b)(i) and containing two or more isocyanate-reactive hydroxyl groups and having a molecular weight of 400 to 10,000.

2. A rigid polyurethane according to claim 1 wherein component (a) is an allophanate-modified aliphatic isocyanurate based on hexamethylene diisocyanate.

3. A rigid polyurethane according to claim 1 wherein component (b)(ii) is a polyether diol other than a polyether of component b)(i).

4. A bowling ball coverstock comprising a rigid polyurethane according to claim 1.

* * * * *